March 7, 1967 KARL-ALBERT ECKSTEIN 3,307,892
CAGE FOR CYLINDRICAL ROLLERS
Filed Aug. 3, 1964

INVENTOR
KARL-ALBERT ECKSTEIN
BY
Hammond & Littell
ATTORNEYS

United States Patent Office 3,307,892
Patented Mar. 7, 1967

3,307,892
CAGE FOR CYLINDRICAL ROLLERS
Karl-Albert Eckstein, Herzogenaurach, Germany, assignor to Industriewerk Schaeffler, Herzogenaurach, Germany, a corporation of Germany
Filed Aug. 3, 1964, Ser. No. 387,127
Claims priority, application Germany, Aug. 13, 1963, J 24,241
4 Claims. (Cl. 308—217)

The invention relates to a thin-walled cage for cylindrical rollers wherein the apertures accommodating the rollers are bounded by cross-bars which guide and/or retain the roller elements and which are connected together at both axial ends by end rings.

That roller cages must be guided concentrically with respect to the roller raceways is known and in certain cases the cage can be guided on the rollers themselves but this solution is not satisfactory since it involves a high rate of wear on the cage bars. Therefore, attempts have been made to guide the cage concentrically on the roller raceways themselves. However, in the case of roller cages made out of thin-walled material such as sheet metal, this presents difficulties. For example, sheet metal cages of this type provided with radially-outwardly directed rims at their ends are known and it is possible to use the outer surfaces of the rims to guide the cage on the outer roller raceway. However, with thin-walled sheet metal cages, this outer surface is so narrow that a high degree of wear must be expected.

It is an object of the invention to provide a thin-walled cage for cylindrical rollers which is guided concentrically on the outer roller raceway.

This and other objects and advantages of the invention will become obvious from the following detailed description.

The thin-walled cage of the invention for cylindrical rollers is comprised of apertures accommodating the rollers bounded by cross-bars which guide and/or retain the rollers and end rings at both axial ends of the cross-bars connecting them together, the outer diameter of the end rings being such that the cage is guided on the outer roller raceway and at their side adjacent to the cross-bars, the diameter of the end rings narrows in diameter to the smaller diameter at which the cross-bar ends are disposed.

In this way, the axially-directed end rings can be used for guiding the cage in the outer roller raceway because of their freely selectable outer diameter and these guide surfaces can be made optionally broad. Also, this construction of the end rings results in a fairly considerable stiffening of the entire cage.

The axially-directed end rings may also merge at their outer ends into radially-inwardly directed rims which provides not only an advantageous guide surface for the cage but also satisfactory abutment surfaces for the axial abutment of the cage.

Referring now to the drawings.

Figure 1:
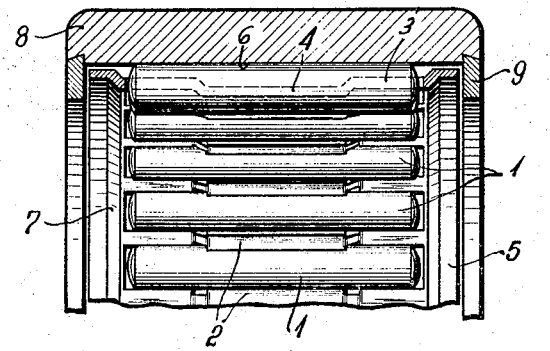
FIG. 1 is an axial sectional view of a roller bearing showing one cage embodiment of the invention.

In the roller bearing illustrated in FIG. 1, the rollers 1 are arranged in apertures in a cage which are bounded in the peripheral direction by cross-bars 2. The said cross-bars have end section 3 which are disposed approximately on the roller centers and a center section 4 which is inwardly offset and wider than the end section 3 to prevent the rollers 1 from falling out in the inward direction.

The rollers are guided axially-parallel by the end sections 3. The ends of the cross-bars 2 are connected by end rings 5 which are of such an external diameter that the cage is guided by this outer diameter in the outer raceway 6 for the rollers 1. At their sides adjacent the ends of the cross-bars 2, the end rings 5 are connected to the said cross-bars by portion 7. The said cage is arranged in a massive outer race 8 which is laterally closed by closure discs 9.

Figure 2:
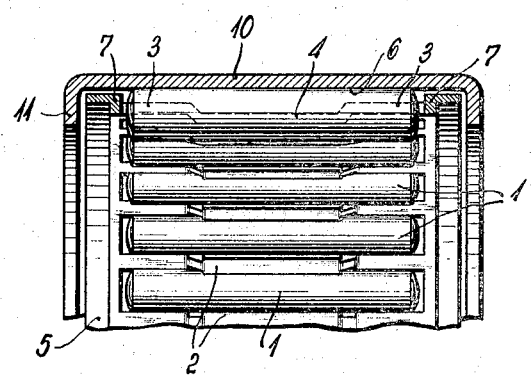
FIG. 2 is an axial sectional view of another roller bearing showing a modified cage embodiment of FIG. 1.

In the embodiment illustrated in FIG. 2, the described cage is arranged in a race sleeve 10 drawn from sheet metal and having a rim 11 formed-on to the sleeve without cutting. Due to the manufacturing technique, this construction has a certain rounding at the transition from the rim 11 and the roller raceway in the sleeve 10. Therefore, it may be expedient to provide the outer edge of the end rings 5 of the cage with a bevelled or rounded portion whose dimensions are equal to or greater than the radius in the race sleeve.

Figure 3:
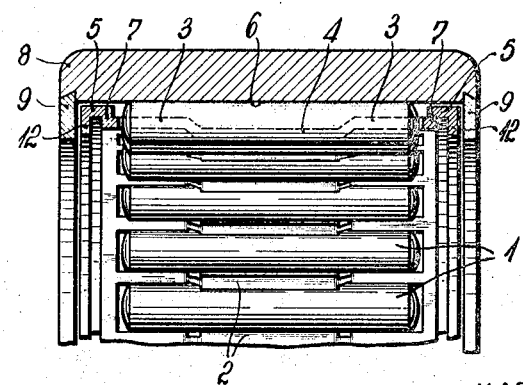
FIG. 3 is an axial sectional view through half a needle bearing with another cage construction.

The embodiment illustrated in FIG. 3 differs from that of FIG. 1 merely in that the axially-directed end rings 5 are provided at their outer ends additionally with radially-inwardly directed rims 12 to provide efficient abutment surfaces for the axial abutment of the cage against the closure rings 9.

Various modifications of the cage of the invention may be made without departing from the spirit or scope thereof and it is to be understood that the invention is to be limited only as defined in the appended claims.

I claim:

1. A roller bearing comprising a laterally closed outer raceway and cylindrical rollers in a thin-walled cage, the said cage comprising apertures to accommodate the rollers bounded by cross-bars which guide the rollers and end rings at both axial ends of the cross-bars connecting the cross-bars together, the outer diameter of the end rings being sufficient to guide the cage on the outer roller raceway within the laterally closed outer raceway and the diameter of the side of the end rings adjacent to the cross-bars narrows to the smaller diameter at which the cross-bar ends are situated.

2. The cage of claim 1 wherein the cross-bars retain the rollers.

3. A roller bearing comprising a laterally closed outer raceway and cylindrical rollers in a thin-walled cage, the said cage comprising apertures to accommodate the rollers bounded by cross-bars which guide the rollers and end rings at both axial ends of the cross-bars connecting the cross-bars together, and whose outer ends merge into radially inwardly directed rims, the outer diameter of the end rings being sufficient to guide the cage on the outer roller raceway within the laterally closed outer raceway and the diameter of the side of the end rings adjacent to the cross-bars narrows to the smaller diameter at which the cross-bar ends are situated.

4. The cage of claim 1 wherein the thin-walled cage is made out of sheet metal.

References Cited by the Examiner
UNITED STATES PATENTS

| 2,765,202 | 10/1956 | Barr et al. | 308—217 |
| 2,894,791 | 7/1959 | White et al. | 308—212 |
| 3,173,192 | 3/1965 | Smith | 308—217 |

FOREIGN PATENTS 502,476   11/1954   Italy.

MARTIN P. SCHWADRON, Primary Examiner.
FRANK SUSKO, Examiner.